United States Patent
Wada et al.

(10) Patent No.: US 6,267,892 B1
(45) Date of Patent: Jul. 31, 2001

(54) FLUORIDE INCLUDING WASTE WATER PROCESSING DEVICE AND METHOD CAPABLE OF PROCESSING FLUORIDE INCLUDING WASTE WATER TO HAVE LOW CONCENTRATION OF FLUORIDE

(75) Inventors: Yuji Wada; Kenichi Ikeda, both of Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/353,782

(22) Filed: Jul. 15, 1999

(30) Foreign Application Priority Data

Jul. 15, 1998 (JP) .................................................. 10-200782

(51) Int. Cl.$^7$ ....................................................... C02F 1/56
(52) U.S. Cl. ........................ 210/713; 210/714; 210/725; 210/727; 210/915
(58) Field of Search .................................. 210/713, 714, 210/724, 725, 726, 727, 915

(56) References Cited

U.S. PATENT DOCUMENTS

| | | | |
|---|---|---|---|
| 2,428,418 | * 10/1947 | Goetz et al. ........................ | 210/713 |
| 4,465,597 | * 8/1984 | Herman et al. ...................... | 210/713 |
| 4,657,680 | 4/1987 | Zibrida ................................ | 210/713 |
| 4,808,316 | 2/1989 | Otomura et al. .................... | 210/664 |
| 5,403,495 | * 4/1995 | Kust et al. .......................... | 210/710 |
| 5,443,741 | 8/1995 | Stott et al. ......................... | 210/726 |
| 5,855,793 | * 1/1999 | Ikeda et al. ........................ | 210/711 |

FOREIGN PATENT DOCUMENTS

| | | |
|---|---|---|
| 0421399 A1 | 4/1990 | (EP) . |
| 51-113362 | 10/1976 | (JP) . |
| 60-025584 | 8/1985 | (JP) . |
| 60-166083 | 8/1985 | (JP) . |
| 60-241988 | 11/1985 | (JP) . |
| 1-26755 | 5/1989 | (JP) . |
| 5-185073 | 7/1993 | (JP) . |
| 11-057747 | 2/1999 | (JP) . |

* cited by examiner

Primary Examiner—Peter A. Hruskoci
(74) Attorney, Agent, or Firm—Foley & Lardner

(57) ABSTRACT

In a fluoride including waste water processing device which comprises a reaction vessel and a sedimentation vessel, a calcium compound adding device adds calcium compound in fluoride including waste water in the reaction vessel to react the calcium compound with fluoride of the fluoride including waste water to generate calcium fluoride. The sedimentation vessel has a bottom which is associated with a bottom of the reaction vessel through an opening hole. The fluoride including waste water is sent to the sedimentation vessel from the reaction vessel through the opening hole. The sedimentation vessel has an inclined bottom surface. The calcium fluoride is sent back, by a self-weight of the calcium fluoride, to the reaction vessel from the sedimentation vessel along the inclined bottom surface. An agitator aggregates the fluoride including waste water in the reaction vessel. A polymer solution adding device adds polymer solution in the fluoride including waste water in the reaction vessel. A supernatant liquid draining device drains supernatant liquid of fluoride including waste water from the sedimentation vessel.

28 Claims, 5 Drawing Sheets

F I G. 6

| | FIRST EXPERIMENT EXAMPLE | SECOND EXPERIMENT EXAMPLE | THIRD EXPERIMENT EXAMPLE | FOURTH EXPERIMENT EXAMPLE | FIFTH EXPERIMENT EXAMPLE | SIXTH EXPERIMENT EXAMPLE | SEVENTH EXPERIMENT EXAMPLE | REFERENCE EXAMPLE |
|---|---|---|---|---|---|---|---|---|
| CONCENTRATION OF FLUORIDE (mg/L) | 3.0 | 4.5 | 3.8 | 3.9 | 4.8 | 3.2 | 3.2 | 10.5 |
| CONCENTRATION OF CALCIUM FLUORIDE (%) | 3.0 | 3.8 | 4.1 | 4.0 | 4.3 | 3.9 | 3.9 | — |

FLUORIDE INCLUDING WASTE WATER PROCESSING DEVICE AND METHOD CAPABLE OF PROCESSING FLUORIDE INCLUDING WASTE WATER TO HAVE LOW CONCENTRATION OF FLUORIDE

BACKGROUND OF THE INVENTION

This invention relates to fluoride including waste water processing method and device. The fluoride including waste water is drained from such as factories for manufacturing semiconductor, factories for processing metal surface, factories for manufacturing stainless, and factories for manufacturing ceramics.

1. Description of the Related Art

In the manner which will be described more in detail, a conventional fluoride including waste water processing method comprises a reaction processing step of adding calcium compound in fluoride including waste water which is received in a reaction vessel while the fluoride including waste water is aggregated and of reacting the calcium compound with fluoride of the fluoride including waste water to generate calcium fluoride, a sedimentation processing step of adding coagulant in the fluoride including waste water which is sent to a sedimentation vessel from the reaction vessel and which is aggregated to sediment the calcium fluoride, and a supernatant liquid draining step of draining supernatant liquid of the fluoride including waste water from the sedimentation vessel.

Another conventional fluoride including waste water processing methods are disclosed in Japanese Unexamined Patent Publications (koukai) No. 241988/1985 and No. 166083/1985 and Japanese Examined Patent Publication (koukoku) No. 2675511989. Each of these methods comprises a reaction processing step of adding calcium compound in fluoride including waste water which is received in a reaction vessel while the fluoride including waste water is aggregated and of reacting the calcium compound with fluoride of the fluoride including waste water to generate calcium fluoride, a sedimentation processing step of adding coagulant in the fluoride including waste water which is sent to a sedimentation vessel from the reaction vessel and which is aggregated to sediment the calcium fluoride, a sending back processing step of sending back the calcium fluoride, and a supernatant liquid draining step of draining supernatant liquid of the fluoride including waste water from the sedimentation vessel.

Also, further conventional fluoride including waste water processing methods are disclosed in Japanese Unexamined Patent Publications (koukai) No. 185073/1993 and No. 241988/1985. Each of these methods comprises a step of adding one of high molecular coagulant, ferric salt, and aluminium salt in a time of adding calcium compound in fluoride including waste water which is received in a reaction vessel.

In addition, a conventional organic waste water processing device is disclosed in Japanese Unexamined Patent Publication (koukai) No. 113362/1976. This conventional organic waste water processing device comprises means for reacting, by aeration, organic matter in organic waste water with microbes in activated sludge in a reaction vessel, means for sedimenting the activated sludge in a sedimentation basin after aeration to abstract the activated sludge from the organic matter, and means for sending back the activated sludge which is abstract from organic matter to the reaction vessel.

However, in the conventional fluoride including waste water processing methods, it is difficult that the fluoride including waste water becomes to have concentration of fluoride that is a value less than 5 mg/litre. Also, in the conventional fluoride including waste water processing methods, it is difficult that the fluoride including waste water in the reaction vessel becomes to have concentration of calcium fluoride that is a value more than 2%. In addition, since, in the conventional fluoride including waste water processing methods, it needs to hold high concentration of calcium fluoride of the fluoride including waste water in the reaction vessel, great volume of water for sending back the calcium fluoride to the reaction vessel from the sedimentation vessel is needed.

SUMMARY OF THE INVENTION

It is therefore an object of this invention to provide fluoride including waste water processing method and device which are capable of processing fluoride including waste water so that the fluoride including waste water becomes to have concentration of fluoride that is a value less than 5 mg/litre.

It is another object of this invention to provide fluoride including waste water processing method and device which are capable of processing fluoride including waste water so that the fluoride including waste water in the reaction vessel becomes to have concentration of calcium fluoride that is a value more than 2%.

It is another object of this invention to provide fluoride including waste water processing method and device which are capable of processing fluoride including waste water so that great volume of water for sending back the calcium fluoride to the reaction vessel from the sedimentation vessel is not needed for holding high concentration of calcium fluoride of the fluoride including waste water in the reaction vessel.

Other objects of this invention will become clear as the description proceeds.

According to a first aspect of this invention, there is provided a method of processing fluoride including waste water, comprising:

a reaction processing step of adding calcium compound and coagulant in fluoride including waste water which is received in a reaction vessel while the fluoride including waste water is aggregated and of reacting the calcium compound with fluoride of the fluoride including waste water to generate calcium fluoride;

a hold processing step of holding, in the reaction vessel, the at least part of the calcium fluoride which is generated in the reaction processing step;

a sedimentation processing step of sedimenting the calcium fluoride in the fluoride including waste water in a sedimentation vessel that is sent from the reaction vessel, a bottom of the sedimentation vessel being associated with a bottom of the reaction vessel through an opening hole, the fluoride including waste water being sent to the sedimentation vessel from the reaction vessel through the opening hole; and a supernatant liquid draining step of draining supernatant liquid from the sedimentation vessel.

According to a second aspect of this invention, there is provided a method of processing fluoride including waste water, comprising:

a reaction processing step of adding calcium compound and coagulant in fluoride including waste water which is received in a reaction vessel while the fluoride including waste water is aggregated and of reacting the calcium compound with fluoride of the fluoride including waste water to generate calcium fluoride;

a hold processing step of holding, in the reaction vessel, the at least part of the calcium fluoride which is generated in the reaction processing step;

a sedimentation processing step of sedimenting the calcium fluoride in the fluoride including waste water in a sedimentation vessel that is sent from the reaction vessel, a bottom of the sedimentation vessel being associated with a bottom of the reaction vessel through an opening hole, the fluoride including waste water being sent to the sedimentation vessel from the reaction vessel through the opening hole;

a sending back processing step of sending back the calcium fluoride to the reaction vessel from the sedimentation vessel, the sedimentation vessel having an inclined bottom surface, the calcium fluoride being sent back, by a self-weight of the calcium fluoride, to the reaction vessel from the sedimentation vessel along the inclined bottom surface; and a supernatant liquid draining step of draining supernatant liquid from the sedimentation vessel.

According to a third aspect of this invention, there is provided a method of processing fluoride including waste water, comprising:

a reaction processing step of adding calcium compound and coagulant in fluoride including waste water which is received in a reaction vessel while the fluoride including waste water is aggregated and of reacting the calcium compound with fluoride of the fluoride including waste water to generate calcium fluoride;

a hold processing step of holding, in the reaction vessel, the at least part of the calcium fluoride which is generated in the reaction processing step; and a first sedimentation processing step of sedimenting the calcium fluoride in the fluoride including waste water in a sedimentation vessel that is sent from the reaction vessel, a bottom of the first sedimentation vessel being associated with a bottom of the reaction vessel through an opening hole, the fluoride including waste water being sent to the first sedimentation vessel from the reaction vessel through the opening hole;

a coagulation processing step of adding the coagulant in the fluoride including waste water which is sent to a coagulation vessel from the first sedimentation vessel and which is aggregated to coagulate the calcium fluoride which is generated in the a reaction processing step;

a second sedimentation processing step of sedimenting the calcium fluoride in the fluoride including waste water which is sent to a second sedimentation vessel from the coagulation vessel; and a supernatant liquid draining step of draining supernatant liquid from the second sedimentation vessel.

According to a fourth aspect of this invention, there is provided a method of processing fluoride including waste water, comprising:

a reaction processing step of adding calcium compound and coagulant in fluoride including waste water which is received in a reaction vessel while the fluoride including waste water is aggregated and of reacting the calcium compound with fluoride of the fluoride including waste water to generate calcium fluoride;

a hold processing step of holding, in the reaction vessel, the at least part of the calcium fluoride which is generated in the reaction processing step;

a first sedimentation processing step of sedimenting the calcium fluoride in the fluoride including waste water in a sedimentation vessel that is sent from the reaction vessel, a bottom of the first sedimentation vessel being associated with a bottom of the reaction vessel through an opening hole, the fluoride including waste water being sent to the first sedimentation vessel from the reaction vessel through the opening hole;

a sending back processing step of sending back the calcium fluoride to the reaction vessel from the sedimentation vessel, the first sedimentation vessel having an inclined bottom surface, the calcium fluoride being sent back, by a self-weight of the calcium fluoride, to the reaction vessel from the first sedimentation vessel along the inclined bottom surface;

a coagulation processing step of adding the coagulant in the fluoride including waste water which is sent to a coagulation vessel from the first sedimentation vessel and which is aggregated to coagulate the calcium fluoride which is generated in the a reaction processing step;

a second sedimentation processing step of sedimenting the calcium fluoride in the fluoride including waste water which is sent to a second sedimentation vessel from the coagulation vessel; and a supernatant liquid draining step of draining supernatant liquid of the fluoride including waste water from the second redimentation vessel.

According to a fifth aspect of this invention, there is provided a fluoride including waste water processing device comprising:

a reaction vessel for receiving fluoride including waste water;

calcium compound adding means for adding calcium compound in fluoride including waste water which is received in the reaction vessel and for reacting the calcium compound with fluoride of the fluoride including waste water to generate calcium fluoride;

a sedimentation vessel for receiving fluoride including waste water from the reaction vessel, the sedimentation vessel having a bottom which is associated with a bottom of the reaction vessel through an opening hole, the fluoride including waste water being sent to the sedimentation vessel from the reaction vessel through the opening hole, the sedimentation vessel having an inclined bottom surface, the calcium fluoride being sent back, by a self-weight of the calcium fluoride, to the reaction vessel from the sedimentation vessel along the inclined bottom surface;

aggregating means for aggregating the fluoride including waste water in the reaction vessel;

coagulant adding means for adding coagulant in the fluoride including waste water in the reaction vessel; and supernatant liquid draining means for draining supernatant liquid of the fluoride including waste water from the sedimentation vessel.

According to a sixth aspect of this invention, there is provided a fluoride including waste water processing device comprising:

a reaction vessel for receiving fluoride including waste water;

calcium compound adding means for adding calcium compound in fluoride including waste water which is received in the reaction vessel and for reacting the calcium compound with fluoride of the fluoride including waste water to generate calcium fluoride;

a first sedimentation vessel for receiving fluoride including waste water from the reaction vessel, the sedimentation vessel having a bottom which is associated with a bottom of the reaction vessel through an opening hole, the fluoride including waste water being sent to the first sedimentation vessel from the reaction vessel through the opening hole, the first sedimentation vessel having an inclined bottom surface, the calcium fluoride being sent back, by a self-weight of the calcium fluoride, to the reaction vessel from the sedimentation vessel along the inclined bottom surface;

first aggregating means for aggregating the fluoride including waste water in the reaction vessel;

first coagulant adding means for adding coagulant in the fluoride including waste water in the reaction vessel;

a coagulation vessel for receiving fluoride including waste water from the first sedimentation vessel;

second aggregating means for aggregating the fluoride including waste water in the coagulation vessel;

second coagulant adding means for adding coagulant in the fluoride including waste water in the coagulation vessel;

a second sedimentation vessel for receiving fluoride including waste water from the coagulation vessel; and supernatant liquid draining means for draining supernatant liquid of the fluoride including waste water from the second sedimentation vessel.

BRIEF DESCRIPTION OF THE DRAWINGS

FIG. 6 is a view for describing concentration of fluoride in fluoride including waste water in the sedimentation vessel according to first through seventh experiment examples of this invention and a reference example of the conventional fluoride including waste water processing device of FIG. 1.

DESCRIPTION OF THE PREFERRED EMBODIMENTS

Figure 1:
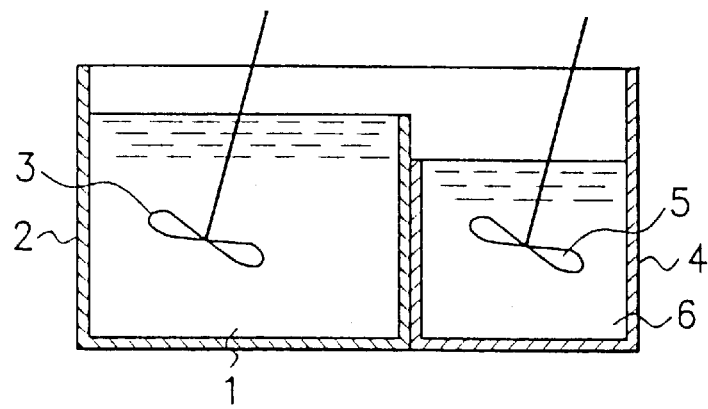
FIG. 1 is a schematic section view of a conventional fluoride including waste water processing device.

Referring to FIG. 1, a conventional fluoride including waste water processing method will first described for a better understanding of this invention.

The conventional fluoride including waste water processing method comprises a reaction processing step, a sedimentation processing step, and a supernatant liquid draining step. The reaction processing step is a step of adding calcium compound in fluoride including waste water 1 which is received in a reaction vessel 2 while the fluoride including waste water 1 is aggregated by an agitator 3 and of reacting the calcium compound with fluoride of the fluoride including waste water 1 to generate calcium fluoride. The sedimentation processing step is step of adding coagulant in the fluoride including waste water which is sent to a sedimentation vessel 4 from an upper portion of the reaction vessel 2 and which is aggregated by an agitator 5 to sediment the calcium fluoride. The supernatant liquid draining step is a step of draining supernatant liquid of the fluoride including waste water 6 from an upper portion of the sedimentation vessel 4.

However, in the conventional fluoride including waste water processing method, it is difficult that the fluoride including waste water becomes to have concentration of fluoride that is a value less than 5 mg/litre. Also, in the conventional fluoride including waste water processing method, it is difficult that the fluoride including waste water in the reaction vessel becomes to have concentration of calcium fluoride that is a value more than 2%. In addition, since, in the conventional fluoride including waste water processing method, it needs to hold high concentration of calcium fluoride of the fluoride including waste water in the reaction vessel, great volume of water for sending back the calcium fluoride to the reaction vessel from the sedimentation vessel is needed.

Figure 2:
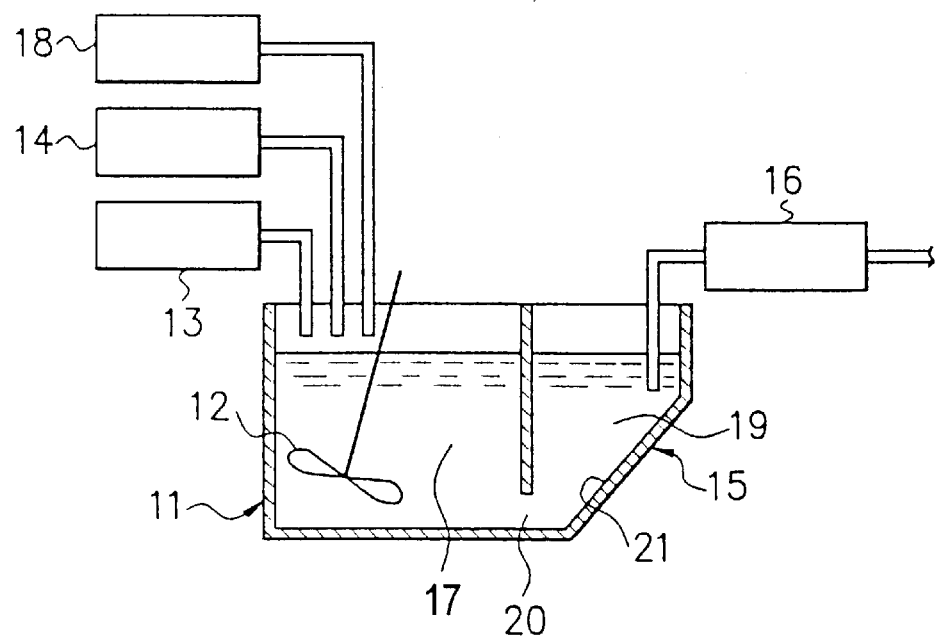
FIG. 2 is a schematic section view of a fluoride including waste water processing device according to a first embodiment of this invention.

Referring to FIG. 2, the description will proceed fluoride including waste water processing method and device according to a first embodiment of this invention.

In FIG. 2, the fluoride including waste water processing device comprises a reaction vessel 11, an agitator 12, a calcium compound adding device 13, a polymer solution adding device 14, a sedimentation vessel 15, and a supernatant liquid draining device 16. The reaction vessel 11 receives fluoride including waste water 17 from a fluoride including waste water inflowing device 18. The agitator 12 is positioned in the reaction vessel 11 and aggregates the fluoride including waste water 17 in the reaction vessel 11.

The calcium compound adding device 13 adds calcium compound in the fluoride including waste water 17 which is received in the reaction vessel 11 and reacts the calcium compound with fluoride of the fluoride including waste water 17 to generate calcium fluoride while the fluoride including waste water in the reaction vessel 11 that is aggregated by the agitator 12. Also, the polymer solution adding device 14 adds polymer solution, as coagulant, in the fluoride including waste water 17 in the reaction vessel 11 while the fluoride including waste water 17 in the reaction vessel 11 that is aggregated by the agitator 12.

The sedimentation vessel 14 is adjacent to the reaction vessel 11. The sedimentation vessel 15 receives the fluoride including waste water 19 from the reaction vessel 11. The sedimentation vessel 15 has a bottom which is associated with a bottom of the reaction vessel 11 through an opening hole 20. The fluoride including waste water 19 is sent to the sedimentation vessel 15 from the reaction vessel 11 through the opening hole 20. The sedimentation vessel 15 has an inclined bottom surface 21. The calcium fluoride in the sedimentation vessel 15 is sent back, by a self-weight of the calcium fluoride, to the reaction vessel 11 from the sedimentation vessel 15 along the inclined bottom surface 21. The supernatant liquid draining device 16 drains supernatant liquid of the fluoride including waste water 19 from the sedimentation vessel 15.

Figure 3:
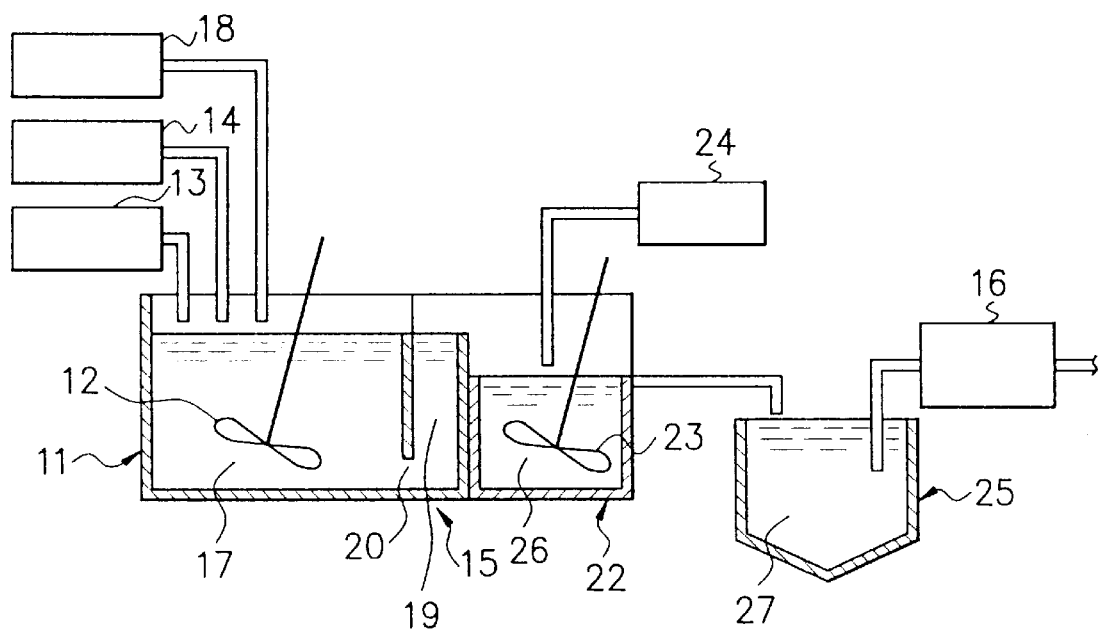
FIG. 3 is a schematic section view of a fluoride including waste water processing device according to a second embodiment of this invention.

Referring to FIG. 3, the description will proceed fluoride including waste water processing method and device according to a second embodiment of this invention. Similar parts are designated by like reference numerals.

In FIG. 3, the fluoride including waste water processing device comprises the reaction vessel 11, the agitator 12, the calcium compound adding device 13, the polymer solution adding device 14, the sedimentation vessel 15, a coagulation vessel 22, another agitator 23, another polymer solution adding device 24, another sedimentation vessel 25, and the supernatant liquid draining device 16.

The sedimentation vessel 15 has not the inclined bottom surface 21. The coagulation vessel 22 is adjacent to the sedimentation vessel 15. The coagulation vessel 22 receives the fluoride including waste water 26 which is sent from an upper portion of the sedimentation vessel 15. The agitator 23 is positioned in the coagulation vessel 22 and aggregates the fluoride including waste water 26 in the coagulation vessel 22. The polymer solution adding device 24 adds polymer solution, as coagulant, in the fluoride including waste water 26 in the coagulation vessel 22 while the fluoride including waste water 26 in the coagulation vessel 22 that is aggregated by the agitator 23.

The sedimentation vessel 25 is adjacent to the coagulation vessel 22. The sedimentation vessel 25 receives the fluoride including waste water 27 which is sent from an upper portion of the coagulation vessel 22. The supernatant liquid draining device 16 drains supernatant liquid of the fluoride including waste water 27 from the sedimentation vessel 25. In addition, the sedimentation vessel 15 of the fluoride including waste water processing device may have the inclined bottom surface 21 (FIG. 2). Also, the fluoride including waste water processing device may comprise a device which adds one of high molecular coagulant, ferric salt, aluminium salt, granular carriers, and calcium fluoride in the fluoride including waste water 17 while the fluoride including waste water 17 in the reaction vessel 11 that is aggregated by the agitator 12.

Referring to FIG. 2, the description will proceed a first experiment example of fluoride including waste water processing method and device according to the first embodiment of this invention. Fluoride including waste water was prepared by dissolving sodium fluoride in water. The fluoride including waste water had a concentration of fluoride of 100 mg/L. In FIG. 2, the fluoride including waste water inflowing device 18 continuously inflowed, at a rate of 1 L/hr, fluoride including waste water in the reaction vessel 11 of 1 L. Also, calcium solution was prepared by dissolving calcium chloride in water and had a concentration of calcium of 20,000 mg/L. Also, polymer solution was prepared by dissolving high molecular coagulant of AP-120 in water. The high molecular coagulant of AP-120 was made by Daiyafurokku Corporation. The calcium compound adding device 13 added, at a rate of 30.6 mL/hr, calcium solution in the fluoride including waste water 17 in the reaction vessel 11 while the agitator 12 aggregated, at a speed of 200 rpm, the fluoride including waste water 17. At the same time, the polymer solution adding device 14 added, at a rate of 10.2 mL/hr, the polymer solution in the fluoride including waste water 17 in the reaction vessel 11 while the agitator 12 aggregated, at a speed of 200 rpm, the fluoride including waste water 17. In the reaction vessel 11, the calcium chloride was reacted with the sodium fluoride in the fluoride including waste water 17 to generate calcium fluoride as a reaction generated material. The calcium fluoride was sedimented and held in the reaction vessel 11.

The fluoride including waste water 17 in the reaction vessel 11 was, at a water area load of 0.14 m/h, flowed to the sedimentation vessel 15 through the opening hole 20. In the sedimentation vessel 15, reaction of the calcium chloride and the sodium fluoride in the fluoride including waste water 19 proceeded to generate the calcium fluoride as the reaction generated material. The calcium fluoride was sedimented in the sedimentation vessel 15. The fluoride including waste water 19 was abstracted to generate the calcium fluoride and supernatant liquid. Thereafter, the calcium fluoride was sent back, through the opening hole 20, to the reaction vessel 11 from the sedimentation vessel 15 along the inclined bottom surface 21. The reaction vessel 11 held the calcium fluoride which was sent back from the sedimentation vessel 15. The supernatant liquid draining device 16 drained supernatant liquid of the fluoride including waste water 19 from the sedimentation vessel 15.

After filtering, by a piece of filter paper, the supernatant liquid of the fluoride including waste water 19 from the supernatant liquid draining device 16, concentration of fluoride was measured. Also, concentration of the calcium fluoride in the reaction vessel 11 was measured. As a result, concentration of fluoride of the supernatant liquid in a reaction time period of the sodium fluoride and the calcium chloride is represented by a line A in FIG. 4. Also, concentration of the calcium fluoride in the reaction vessel 11 is represented by a line B in FIG. 5.

Figure 5:
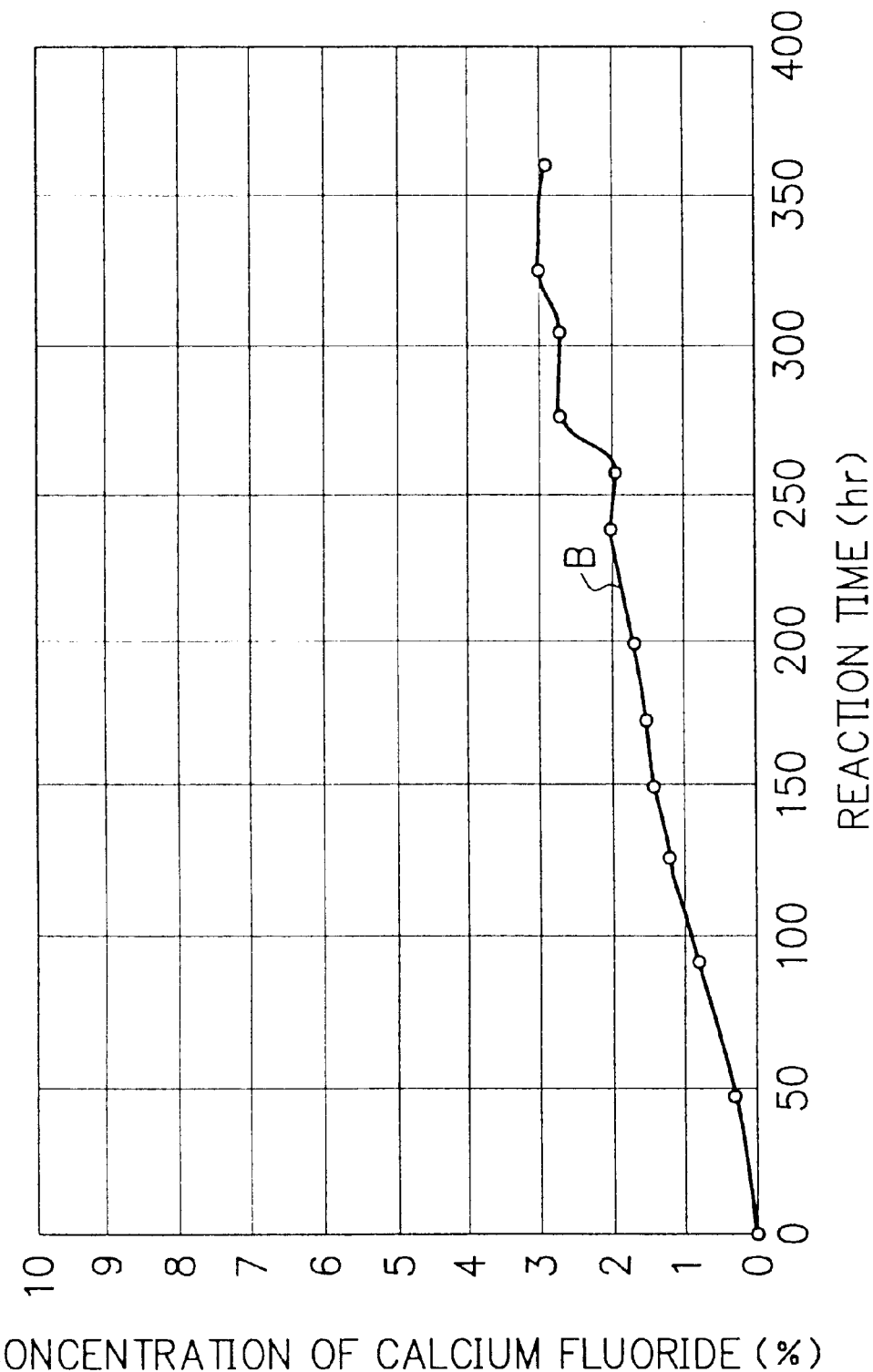
FIG. 5 is a graph for representing concentration of calcium fluoride in fluoride including waste water in a reaction vessel according to the first embodiment of this invention.

As shown by the line B in FIG. 5, concentration of the calcium fluoride in the reaction vessel 11 was increased when a reaction time elapsed. After the reaction time elapsed by a time period more than 300 hr, concentration of the calcium fluoride in the reaction vessel 11 became stable and was equal to about 3%.

Figure 4:
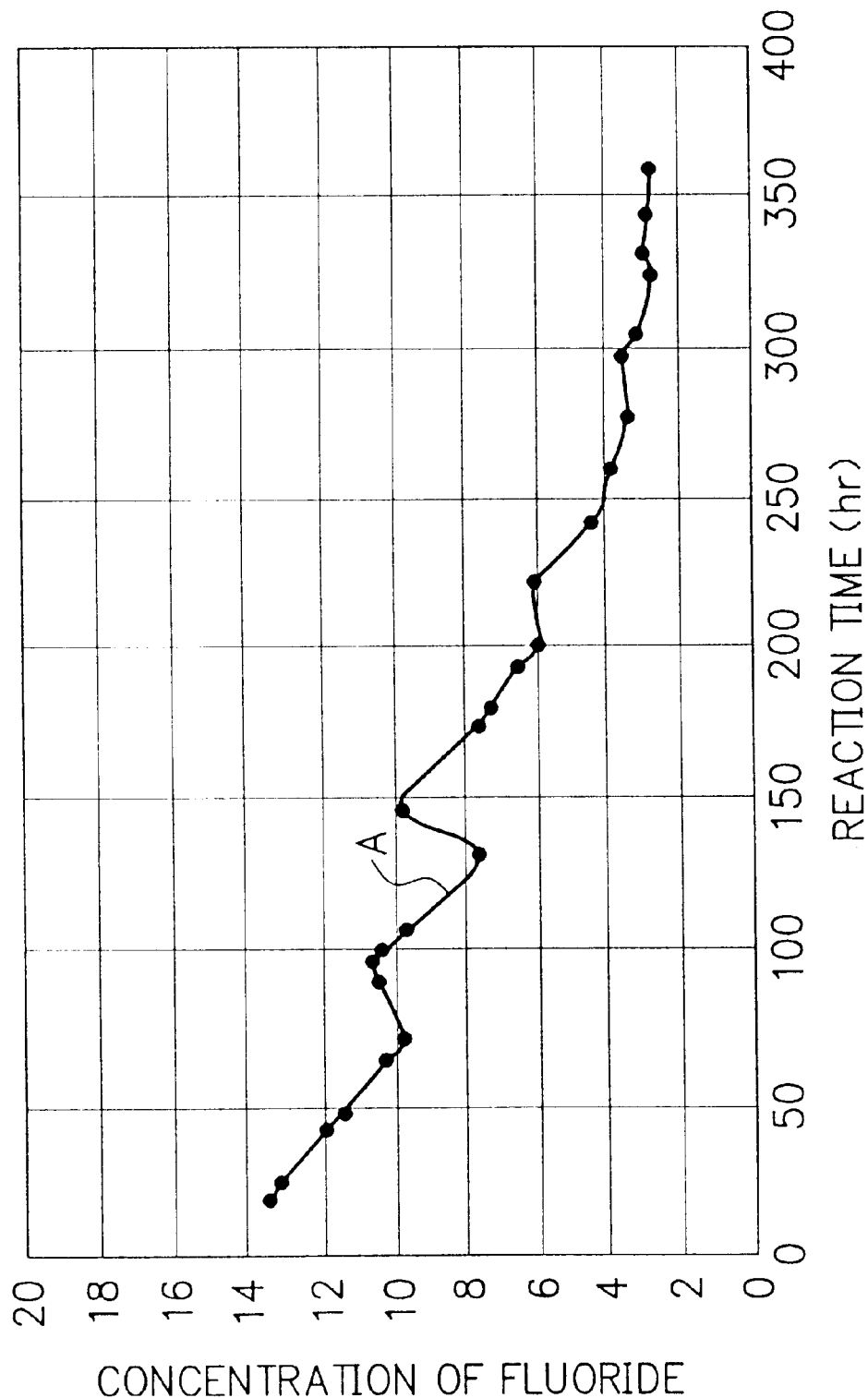
FIG. 4 is a graph for representing of fluoride in fluoride including waste water in a sedimentation vessel according to the first embodiment of this invention.

As shown by the line A in FIG. 4, concentration of fluoride of the supernatant liquid of the fluoride including waste water 19 was decreased when the concentration of the calcium fluoride was increased. Finally, concentration of fluoride of the supernatant liquid of the fluoride including waste water 19 became stable and was equal to about 3 mg/L.

Referring to FIG. 3, the description will proceed a second experiment example of fluoride including waste water processing method and device according to the second embodiment of this invention. Fluoride solution was prepared by dissolving sodium fluoride in water so that the fluoride solution had concentration of fluoride of 25,000 mg/L. Next, calcium chloride solution of 35% was added in the fluoride solution of 1 L so that addition concentration of calcium became 35,000 mg/L. Thereafter, the fluoride solution was aggregated in a time period of 30 min and calcium fluoride was generated in the fluoride solution.

Also, polymer solution was prepared by dissolving high molecular coagulant of AP-120 in water so that polymer solution had concentration of the high molecular coagulant of 1,000 mg/L. The high molecular coagulant of AP-120 was made by Daiyafurokku Corporation. Next, the polymer solution was added in the fluoride solution so that addition concentration of the polymer solution became 100 mg/L to generate seed sludge of the calcium fluoride. The seed sludge of the calcium fluoride was poured into the reaction vessel 11.

Also, fluoride including waste water was prepared by dissolving sodium fluoride in water so that concentration of fluoride became 100 mg/L. In FIG. 3, the fluoride including waste water inflowing device 18 continuously added, at a rate of 1 L/hr, the fluoride including waste water in the reaction vessel 11 which has a volume of 1 L.

In addition, calcium solution was prepared by dissolving calcium chloride in water and had concentration of calcium of 20,000 mg/L. Also, polymer solution was prepared by dissolving high molecular coagulant of AP-120 in water. The high molecular coagulant of AP-120 was made by Daiyafurokku Corporation. The calcium compound adding device 13 added, at a rate of 30.6 mL/hr, calcium solution in the fluoride including waste water 17 in the reaction vessel 11 while the agitator 12 aggregated, at a speed of 200 rpm, the fluoride including waste water 17. At the same time, the polymer solution adding device 14 added, at a rate of 10.2 mL/hr, the polymer solution in the fluoride including waste water 17 in the reaction vessel 11 while the agitator 12 aggregated, at a speed of 200 rpm, the fluoride including waste water 17. In the reaction vessel 11, the calcium chloride was reacted with the sodium fluoride in the fluoride including waste water 17 to generate calcium fluoride as the reaction generated material. The calcium fluoride was sedimented. A part of calcium fluoride was held in the reaction vessel 11. Also, a part of the seed sludge of the calcium fluoride was held reaction vessel 11.

The fluoride including waste water 17 in the reaction vessel 11 was, at a water area load of 5.0 m/h, flowed to the sedimentation vessel 15 through the opening hole 20. In this event, a part of calcium fluoride and a part of the seed sludge of the calcium fluoride were held reaction vessel 11. In the sedimentation vessel 15, reaction of the calcium chloride and the sodium fluoride in the fluoride including waste water 19 proceeded to generate the calcium fluoride as the reaction generated material. The calcium fluoride was sedimented in the sedimentation vessel 15. Thereafter, a part of the calcium fluoride was sent back, through the opening hole 20, to the reaction vessel 11 from the sedimentation vessel 15 along the inclined bottom surface 21. The reaction vessel 11 held the calcium fluoride which was sent back from the sedimentation vessel 15. The fluoride including waste water 19 was flowed to the coagulation vessel 22 from the upper portion of the sedimentation vessel 15.

Also, polymer solution was prepared by dissolving high molecular coagulant of AP-120 in water. The high molecular coagulant of AP-120 was made by Daiyafurokku Corporation. Next, the polymer solution was, by the polymer solution adding device 24, added in the fluoride including waste water 26 in the coagulation vessel 22 of a volume of 100 mL so that addition concentration of the polymer solution became 2 mg/L while the agitator 23 aggregated, by a speed of 100 rpm, the fluoride including waste water 26 in the coagulation vessel 22. Next, the fluoride including waste water 26 was flowed to the sedimentation vessel 25 from the upper portion of the coagulation vessel 22. In the sedimentation vessel 25, a reaction generated material in the fluoride including waste water 27 was sedimented.

After filtering, by a piece of filter paper, the supernatant liquid of the fluoride including waste water 27 from the supernatant liquid draining device 16 when a reaction time elapsed by a time period of 10 hr, concentration of fluoride was measured. Also, concentration of the calcium fluoride in the reaction vessel 11 was measured. As a result, concentration of fluoride of the supernatant liquid was equal to 4.5 mg/L. Also, concentration of the calcium fluoride in the reaction vessel 11 was equal to 3.8%.

Referring to FIG. 3, the description will proceed a third experiment example of fluoride including waste water processing method and device according to the second embodiment of this invention. The seed sludge of the calcium fluoride was prepared by the same method of the second experiment example. Also, calcium carbonate powder of 50 g was prepared. The seed sludge of the calcium fluoride and the calcium carbonate powder of 50 g were poured into the reaction vessel 11. The process under the same condition of the second experiment example was executed. Concentration of fluoride was measured. Also, concentration of the calcium fluoride in the reaction vessel 11 was measured. As a result, concentration of fluoride of the supernatant liquid was equal to 4.8 mg/L. Also, concentration of the calcium fluoride in the reaction vessel 11 was equal to 4.1%.

Referring to FIG. 3, the description will proceed a fourth experiment example of fluoride including waste water processing method and device according to the second embodiment of this invention. Ferric iron hydroxide was prepared by dissolving ferric salt, as iron ion, in water so that concentration of ferric salt became to 400 mg/L and by dissolving caustic soda of 25% in the water so that PH of the water became to 7. Also, the seed sludge of the calcium fluoride was prepared by the same method of the second experiment example. The seed sludge of the calcium fluoride and the ferric iron hydroxide of 50 mL were poured into the reaction vessel 11. The process under the same condition of the second experiment example was executed. Concentration of fluoride was measured. Also, concentration of the calcium fluoride in the reaction vessel 11 was measured. As a result, concentration of fluoride of the supernatant liquid was equal to 3.9 mg/L. Also, concentration of the calcium fluoride in the reaction vessel 11 was equal to 4.0%.

Referring to FIG. 3, the description will proceed a fifth experiment example of fluoride including waste water processing method and device according to the second embodiment of this invention. Aluminium hydroxide was prepared by dissolving aluminium sulfate, as aluminium ion, in water so that concentration of aluminium sulfate became to 400 mg/L and by dissolving caustic soda of 25% in the water so that PH of the water became to 7. Also, the seed sludge of the calcium fluoride was prepared by the same method of the second experiment example. The seed sludge of the calcium fluoride and the aluminium hydroxide of 50 mL were poured into the reaction vessel 11. The process under the same condition of the second experiment example was executed. Concentration of fluoride was measured. Also, concentration of the calcium fluoride in the reaction vessel 11 was measured. As a result, concentration of fluoride of the supernatant liquid was equal to 4.8 mg/L. Also, concentration of the calcium fluoride in the reaction vessel 11 was equal to 4.3%.

Referring to FIG. 3, the description will proceed a sixth experiment example of fluoride including waste water processing method and device according to the second embodiment of this invention. Silicagel (28 to 200 mesh) of 50 g was prepared. Also, the seed sludge of the calcium fluoride was prepared by the same method of the second experiment example. The seed sludge of the calcium fluoride and the Silicagel of 50 g were poured into the reaction vessel 11. The process under the same condition of the second experiment example was executed. Concentration of fluoride was measured. Also, concentration of the calcium fluoride in the reaction vessel 11 was measured. As a result, concentration of fluoride of the supernatant liquid was equal to 3.2 mg/L. Also, concentration of the calcium fluoride in the reaction vessel 11 was equal to 3.9%.

Referring to FIG. 3, the description will proceed a seventh experiment example of fluoride including waste water processing method and device according to the second embodiment of this invention. Granular fluorspar (fineness of 96%, grading of 50 to 150 mesh) was prepared. The granular fluorspar was poured into the reaction vessel 11. The process under the same condition of the second experiment example was executed. Concentration of fluoride was measured. Also, concentration of the calcium fluoride in the reaction vessel 11 was measured. As a result, concentration of fluoride of the supernatant liquid was equal to 3.2 mg/L.

Also, concentration of the calcium fluoride in the reaction vessel 11 was equal to 4.9%.

Referring to FIG. 1, the description will proceed a reference example of the conventional fluoride including waste water processing method and device of FIG. 1. Fluoride including waste water was prepared by dissolving sodium fluoride in water so that the fluoride solution had concentration of fluoride of 100 mg/L. Next, calcium chloride solution was prepared by dissolving calcium chloride in water so that concentration of calcium became 20,000 mg/L. Next, the fluoride including waste water continuously was, by a rate of 1 L/hr, inflowed in the reaction vessel 2 of a volume of 1 L. At the same time, the calcium chloride solution continuously was, by a rate of 30.6 mL/hr, inflowed in the reaction vessel 2 while the agitator 3, by a speed of 200 rpm, aggregated the fluoride including waste water 1 in the reaction vessel 2.

Also, polymer solution was prepared by dissolving high molecular coagulant of AP-120 in water so that polymer solution had concentration of the high molecular coagulant of 100 mg/L. The high molecular coagulant of AP-120 was made by Daiyafurokku Corporation. Next, the polymer solution was added in the sedimentation vessel 2 of a volume of 100 mL so that addition concentration of the polymer solution became 2 mg/L while the agitator 5, by a speed of 100 rpm, aggregated the fluoride including waste water 6 in the sedimentation vessel 4. After filtering, by a piece of filter paper, the supernatant liquid of the fluoride including waste water 6 from a supernatant liquid draining device (not shown) when a reaction time elapsed by a time period of 10 hr, concentration of fluoride was measured. As a result, concentration of fluoride of the supernatant liquid was equal to 10.5 mg/L. The concentration of fluoride of the supernatant liquid in the first through seventh experiment examples and the reference example is represented in FIG. 6. Also, the concentration of the calcium fluoride in the reaction vessel 11 is represented in FIG. 6.

According to this invention, it is possible to process fluoride including waste water so that the fluoride including waste water becomes to have concentration of fluoride that is a value less than 5 mg/litre.

Also, according to this invention, it is possible to process fluoride including waste water so that the fluoride including waste water in the reaction vessel becomes to have concentration of calcium fluoride that is a value more than 2%.

In addition, according to this invention, it is possible to process fluoride including waste water so that great volume of water for sending back the calcium fluoride to the reaction vessel from the sedimentation vessel is not needed for holding high concentration of calcium fluoride of the fluoride including waste water in the reaction vessel.

What is claimed is:

1. A method of processing fluoride including waste water, comprising:
   a reaction processing step of adding calcium compound and coagulant in fluoride including waste water which is received in a reaction vessel while said fluoride including waste water is aggregated and of reacting said calcium compound with fluoride of said fluoride including waste water to generate calcium fluoride;
   a hold processing step of holding, in said reaction vessel, said at least part of said calcium fluoride which is generated in said reaction processing step;
   a sedimentation processing step of sedimenting said calcium fluoride in said fluoride including waste water that is sent from said reaction vessel in a sedimentation vessel that is located adjacent to the reaction vessel, a bottom of said sedimentation vessel having a common bottom surface with said reaction vessel associated through an opening hole in a sidewall of said sedimentation vessel, said fluoride including waste water being sent to said sedimentation vessel from said reaction vessel through said opening hole; and
   a supernatant liquid draining step of draining supernatant liquid from said sedimentation vessel.

2. A method of processing fluoride including waste water as claimed in claim 1, wherein said method comprises a step of adding a polymer coagulant in said fluoride including waste water which is received in said reaction vessel.

3. A method of processing fluoride including waste water as claimed in claim 1, wherein said method comprises a step of adding ferric salt in said fluoride including waste water which is received in said reaction vessel.

4. A method of processing fluoride including waste water as claimed in claim 1, wherein said method comprises a step of adding aluminium salt in said fluoride including waste water which is received in said reaction vessel.

5. A method of processing fluoride including waste water as claimed in claim 1, wherein said method comprises a step of adding granular carrier in said fluoride including waste water which is received in said reaction vessel.

6. A method of processing fluoride including waste water as claimed in claim 1, wherein said method comprises a step of adding said calcium fluoride in said fluoride including waste water which is received in said reaction vessel.

7. The method of claim 1, wherein calcium fluoride concentration in the reaction vessel is maintained at above 2% after a first reaction time.

8. The method of claim 7, wherein fluoride concentration in the supernatant liquid is maintained at below 5 mg/L after the first reaction time.

9. The method of claim 8, wherein the first reaction time is 250 hours.

10. The method of claim 8, wherein the first reaction time is 10 hours.

11. A method of processing fluoride including waste water, comprising:
   a reaction processing step of adding calcium compound and coagulant in fluoride including waste water which is received in a reaction vessel while said fluoride including waste water is aggregated and of reacting said calcium compound with fluoride of said fluoride including waste water to generate calcium fluoride;
   a hold processing step of holding, in said reaction vessel, said at least part of said calcium fluoride which is generated in said reaction processing step;
   a sedimentation processing step of sedimenting said calcium fluoride in said fluoride including waste water that is sent from said reaction vessel in a sedimentation vessel that is located adjacent to the reaction vessel, said sedimentation vessel having a common a bottom surface with said reaction vessel associated through an opening hole in a sidewall of the sedimentation vessel, said fluoride including waste water being sent to said sedimentation vessel from said reaction vessel through said opening hole;
   a sending back processing step of sending back said calcium fluoride to said reaction vessel from said sedimentation vessel, said sedimentation vessel having an inclined bottom surface, said calcium fluoride being sent back, by a self-weight of said calcium fluoride, to said reaction vessel from said sedimentation vessel along said inclined bottom surface; and a supernatant liquid draining step of draining supernatant liquid from said sedimentation vessel.

12. A method of processing fluoride including waste water as claimed in claim 11, wherein said method comprises a step of adding a polymer coagulant in said fluoride including waste water which is received in said reaction vessel.

13. A method of processing fluoride including waste water as claimed in claim 11, wherein said method comprises a step of adding ferric salt in said fluoride including waste water which is received in said reaction vessel.

14. A method of processing fluoride including waste water as claimed in claim 11, wherein said method comprises a step of adding aluminium salt in said fluoride including waste water which is received in said reaction vessel.

15. A method of processing fluoride including waste water as claimed in claim 11, wherein said method comprises a step of adding granular carrier in said fluoride including waste water which is received in said reaction vessel.

16. A method of processing fluoride including waste water as claimed in claim 11, wherein said method comprises a step of adding said calcium fluoride in said fluoride including waste water which is received in said reaction vessel.

17. A method of processing fluoride including waste water, comprising:
    a reaction processing step of adding calcium compound and coagulant in fluoride including waste water which is received in a reaction vessel while said fluoride including waste water is aggregated and of reacting said calcium compound with fluoride of said fluoride including waste water to generate calcium fluoride;
    a hold processing step of holding, in said reaction vessel, said at least part of said calcium fluoride which is generated in said reaction processing step; and
    a first sedimentation processing step of sedimenting said calcium fluoride in said fluoride including waste water that is sent from said reaction vessel in a sedimentation vessel that is located adjacent to the reaction vessel, a bottom of said first sedimentation vessel having a common bottom surface with said reaction vessel associated through an opening hole in a sidewall of said first sedimentation vessel, said fluoride including waste water being sent to said first sedimentation vessel from said reaction vessel through said opening hole;
    a coagulation processing step of adding said coagulant in said fluoride including waste water which is sent to a coagulation vessel from said first sedimentation vessel and which is aggregated to coagulate said calcium fluoride which is generated in said reaction processing step;
    a second sedimentation processing step of sedimenting said calcium fluoride in said fluoride including waste water which is sent to a second sedimentation vessel from said coagulation vessel; and
    a supernatant liquid draining step of draining supernatant liquid from said second sedimentation vessel.

18. A method of processing fluoride including waste water as claimed in claim 17, wherein said method comprises a step of adding a polymer coagulant in said fluoride including waste water which is received in said reaction vessel.

19. A method of processing fluoride including waste water as claimed in claim 17, wherein said method comprises a step of adding ferric salt in said fluoride including waste water which is received in said reaction vessel.

20. A method of processing fluoride including waste water as claimed in claim 17, wherein said method comprises a step of adding aluminium salt in said fluoride including waste water which is received in said reaction vessel.

21. A method of processing fluoride including waste water as claimed in claim 17, wherein said method comprises a step of adding granular carrier in said fluoride including waste water which is received in said reaction vessel.

22. A method of processing fluoride including waste water as claimed in claim 17, wherein said method comprises a step of adding said calcium fluoride in said fluoride including waste water which is received in said reaction vessel.

23. A method of processing fluoride including waste water, comprising:
    a reaction processing step of adding calcium compound and coagulant in fluoride including waste water which is received in a reaction vessel while said fluoride including waste water is aggregated and of reacting said calcium compound with fluoride of said fluoride including waste water to generate calcium fluoride;
    a hold processing step of holding, in said reaction vessel, said at least part of said calcium fluoride which is generated in said reaction processing step;
    a first sedimentation processing step of sedimenting said calcium fluoride in said fluoride including waste water that is sent from said reaction vessel in a sedimentation vessel that is located adjacent to the reaction vessel, said sedimentation vessel having a common bottom surface with said reaction vessel associated through an opening hole in a sidewall of the sedimentation vessel, said fluoride including waste water being sent to said first sedimentation vessel from said reaction vessel through said opening hole;
    a sending back processing step of sending back said calcium fluoride to said reaction vessel from said sedimentation vessel, said first sedimentation vessel having an inclined bottom surface, said calcium fluoride being sent back, by a self-weight of said calcium fluoride, to said reaction vessel from said first sedimentation vessel along said inclined bottom surface;
    a coagulation processing step of adding said coagulant in said fluoride including waste water which is sent to a coagulation vessel from said first sedimentation vessel and which is aggregated to coagulate said calcium fluoride which is generated in said reaction processing step;
    a second sedimentation processing step of sedimenting said calcium fluoride in said fluoride including waste water which is sent to a second sedimentation vessel from said coagulation vessel; and
    a supernatant liquid draining step of draining supernatant liquid of said fluoride including waste water from said second sedimentation vessel.

24. A method of processing fluoride including waste water as claimed in claim 23, wherein said method comprises a step of adding a polymer coagulant in said fluoride including waste water which is received in said reaction vessel.

25. A method of processing fluoride including waste water as claimed in claim 23, wherein said method comprises a step of adding ferric salt in said fluoride including waste water which is received in said reaction vessel.

26. A method of processing fluoride including waste water as claimed in claim 23, wherein said method comprises a step of adding aluminium salt in said fluoride including waste water which is received in said reaction vessel.

27. A method of processing fluoride including waste water as claimed in claim 23, wherein said method comprises a step of adding granular carrier in said fluoride including waste water which is received in said reaction vessel.

28. A method of processing fluoride including waste water as claimed in claim 23, wherein said method comprises a step of adding said calcium fluoride in said fluoride including waste water which is received in said reaction vessel.

* * * * *